Patented Nov. 10, 1942

2,301,829

UNITED STATES PATENT OFFICE 2,301,829

PROCESS FOR THE MANUFACTURE OF THE LOWER ALIPHATIC ESTERS OF PANTOTHENIC ACID

André Studer, Basel, Switzerland

No Drawing. Application October 28, 1941, Serial No. 416,904. In Switzerland December 24, 1940

2 Claims. (Cl. 260—482)

It is known that pantothenic acid can be obtained by condensation of β-alanine (β-aminopropionic acid) with α-hydroxy-β,β-dimethyl-γ-butyrolactone (Science, vol. 91, year 1940, page 246; Journal of the American Chemical Society, vol. 62, year 1940, pages 1628, 1784, 1785, 2251). The corresponding preparation of esters of pantothenic acid is rendered difficult by the fact that the esters of β-alanine to be used as starting materials possess various properties which render them unsuitable or inconvenient for technical use. They are unstable in the free state or in form of salts so that they cannot be stored. Consequently, they must be employed immediately after preparation. Moreover, the free esters easily tend to form crystalline polymerisation products (Recueil des Travaux Chimiques des Pays-Bas, vol. 25, year 1906, page 79; Zeitschrift für Physiologische Chemie, vol. 85, year 1913, page 118). Their salts are usually hygroscopic and then easily saponify to reform free β-alanine, sometimes even on storing in a desiccator (Archiv der Pharmazie, vol. 242, year 1904, page 610). Furthermore, the preparation and purification of the β-alanine esters is a technically very complicated measure which also entails losses (Zeitschrift für Physiologische Chemie, vol. 85, year 1913, page 117).

It has now been found that the esters of pantothenic acid can be obtained without the disadvantages just mentioned by subjecting esters of β-nitropropionic acid to catalytic hydrogenation in presence of α-hydroxy-β,β-dimethyl-γ-butyrolactone. The course of the reaction can be illustrated by the following formulae:

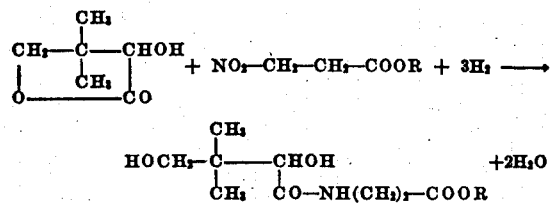

In this manner esters of pantothenic acid are readily obtained which was the less to be expected since the formation of β-amino-propionic acid from β-nitro-propionic acid by means of catalytically activated hydrogen has hitherto not been described in the literature. It could, therefore, not be anticipated that the manufacture of esters of pantothenic acid would succeed in the manner indicated.

In tests carried out on the growth of rats and other animals, the same results are obtained with the esters of pantothenic acid as with free pantothenic acid.

Example 1

130 parts by weight of α-hydroxy-β,β-dimethyl-γ-butyrolactone are treated with 147 parts by weight of β-nitro-propionic acid ethyl ester in 500 parts by weight of methanol with a platinum or palladium catalyst in a pressure vessel with hydrogen under pressure at 90–100° C. When 6 mols of hydrogen have been taken up, the hydrogenation ceases. After cooling, the product is sucked off from the catalyst and the filtrate evaporated to dryness. The pantothenic acid ethyl ester is thus obtained as a clear syrup.

If the levorotatory lactone is used as starting material, a dextrorotatory pantothenic acid ester is obtained.

Example 2

130 parts by weight of α-hydroxy-β,β-dimethyl-γ-butyro-lactone are treated with 133 parts by weight of β-nitro-propionic acid methyl ester in 500 parts by weight of methanol with a nickel catalyst in a pressure vessel with hydrogen at 80–100° C. and a gauge pressure of 20–40 atm. When 6 mols of hydrogen have been taken up, the hydrogenation ceases. After cooling, the product is sucked off from the catalyst and the filtrate evaporated to dryness. A yellow oil is obtained which, after distillation in a molecular still, yields pantothenic acid methyl ester as a colourless syrup.

I claim:

1. Process for the manufacture of the lower aliphatic esters of pantothenic acid, comprising causing catalytically activated hydrogen to act on the lower aliphatic esters of β-nitro-propionic acid in presence of α-hydroxy-β,β-dimethyl-γ-butyrolactone at raised temperatures.

2. Process for the manufacture of the lower aliphatic esters of pantothenic acid, comprising causing catalytically activated hydrogen to act on the lower aliphatic esters of β-nitro-propionic acid in presence of α-hydroxy-β,β-dimethyl-γ-butyrolactone at raised temperatures under pressure and in presence of a solvent.

ANDRÉ STUDER.